(12) United States Patent
Jansson et al.

(10) Patent No.: US 8,701,714 B2
(45) Date of Patent: Apr. 22, 2014

(54) MULTIPLE LAYER PIPE

(75) Inventors: Patrick Jansson, Merikaarto (FI); Charlotta Risku, Vasa (FI)

(73) Assignee: Oy KWH Pipe Ab, Vasa (FI)

( * ) Notice: Subject to any disclaimer, the term of this patent is extended or adjusted under 35 U.S.C. 154(b) by 661 days.

(21) Appl. No.: 12/522,591

(22) PCT Filed: Jan. 10, 2008

(86) PCT No.: PCT/FI2008/050006
§ 371 (c)(1),
(2), (4) Date: Aug. 5, 2009

(87) PCT Pub. No.: WO2008/084140
PCT Pub. Date: Jul. 17, 2008

(65) Prior Publication Data
US 2010/0059132 A1    Mar. 11, 2010

(30) Foreign Application Priority Data
Jan. 10, 2007    (FI) .................................. 20070021

(51) Int. Cl.
*F16L 55/00*    (2006.01)
(52) U.S. Cl.
USPC .............................. 138/36; 138/104; 138/137
(58) Field of Classification Search
USPC .......................................... 138/137, 104, 36
See application file for complete search history.

(56) References Cited

U.S. PATENT DOCUMENTS

| 2,971,538 | A | * | 2/1961 | Brumbach | 138/111 |
|---|---|---|---|---|---|
| 4,303,457 | A |   | 12/1981 | Johansen et al. |   |
| 4,554,650 | A | * | 11/1985 | Brown et al. | 367/154 |
| 5,036,210 | A | * | 7/1991 | Goodman | 235/493 |
| 5,228,478 | A | * | 7/1993 | Kleisle | 138/104 |
| 5,243,128 | A | * | 9/1993 | Marcoz | 174/47 |
| 5,551,484 | A | * | 9/1996 | Charboneau | 138/104 |
| 5,634,497 | A | * | 6/1997 | Neto | 138/127 |
| 5,690,146 | A | * | 11/1997 | Stammen | 138/36 |
| 6,176,269 | B1 |   | 1/2001 | Jaervenkylae |   |
| 6,179,008 | B1 | * | 1/2001 | Kawazura et al. | 138/125 |
| 6,383,587 | B1 |   | 5/2002 | Ageheim et al. |   |
| 6,386,237 | B1 | * | 5/2002 | Chevalier et al. | 138/104 |
| 6,498,991 | B1 | * | 12/2002 | Phelan et al. | 702/34 |

(Continued)

FOREIGN PATENT DOCUMENTS

DE    29807260 U1    7/1998
EP       213674 A1    3/1987

(Continued)

OTHER PUBLICATIONS

Riitta Lantela, Finnish Search Report for FI20070021, Oct. 9, 2007, Helsinki, FI.

*Primary Examiner* — James Hook
(74) *Attorney, Agent, or Firm* — Chernoff Vilhauer McClung & Stenzel LLP

(57) ABSTRACT

Abrasion resistant polymer pipe and a process for the production thereof. The pipe comprises a first, abrasion resistant inner layer (1) and a second, structural layer (2), which is placed on the outer side of the inner layer. The first and the second layers comprise extrudable polymer materials and they are preferably separated by an alarm layer which indicates wear or depletion of the inner layer. The pipe is suitable for use in the mining industry and generally for conducting liquid and gaseous fluids containing abrasive particles.

15 Claims, 2 Drawing Sheets

(56) References Cited

U.S. PATENT DOCUMENTS

| | | |
|---|---|---|
| 6,539,981 B1 * | 4/2003 | Kleven et al. ............... 138/143 |
| 6,550,499 B1 * | 4/2003 | Pai ............... 138/104 |
| 6,616,191 B2 * | 9/2003 | Beal et al. ............... 285/21.2 |
| 6,652,939 B2 * | 11/2003 | Smith et al. ............... 428/35.9 |
| 8,087,430 B1 * | 1/2012 | Betz et al. ............... 138/104 |
| 2002/0033197 A1 * | 3/2002 | Zimmer et al. ............... 138/137 |
| 2002/0189697 A1 | 12/2002 | Jarvenkyla |
| 2004/0065377 A1 * | 4/2004 | Whiteley ............... 138/104 |
| 2004/0094221 A1 * | 5/2004 | Martucci et al. ............... 138/121 |
| 2005/0244576 A1 | 11/2005 | Jarvenkyla |

FOREIGN PATENT DOCUMENTS

| | | |
|---|---|---|
| EP | 0864060 T3 | 9/1998 |
| EP | 1069361 A1 | 1/2001 |
| FI | 106441 B | 1/1998 |
| GB | 2296303 A | 6/1996 |
| JP | 2006266332 A | 10/2006 |
| WO | 9309948 A1 | 5/1993 |
| WO | 2006/123260 A2 | 11/2006 |

\* cited by examiner

MULTIPLE LAYER PIPE

This is a national stage application filed under 35 USC 371 based on International Application No. PCT/FI2008/050006 filed Jan. 10, 2008, and claims priority under 35 USC 119 of Finnish patent application Ser. No. 20070021 filed Jan. 10, 2007.

The present invention relates to a multilayer, abrasion resistant pipe according to the preamble of claim 1.

A pipe of the present kind comprises a first, abrasion resistant inner layer and a second, structural layer which is placed on the outer side of the inner layer.

Slurry handling is a common application for polymer piping since the abrasion resistance of polymer materials, especially polyethylene, is much higher than that of concrete or carbon steel when oxygen is present. For better anti-abrasive properties, polymers having improved abrasive resistance are available but these are usually expensive. As the mining industry is used to low price pipes and frequent service intervals, pipes for slurry handling should be more durable but not considerably more expensive.

It is an aim of the present invention to eliminate problems of the art and to provide a novel kind of abrasion resistant polymer pipes suitable for example for conveying mining industry slurries containing abrasive particles suspended in a liquid or gaseous medium.

The present invention is based on the idea of forming an abrasion resistant polymer pipe from at least two polymer materials which are co-extrudable, whereby the inner layer is formed from a material having improved abrasion resistance with regard to the second material which forms the structural component of the pipe. The improved abrasion resistance can be based either on improved elastic, rubber-like properties or on increased hardness compared to the corresponding properties of the material forming the structural layer.

In view of the fact that the materials of the pipe are co-extrudable, the novel abrasion-resistant pipes can be manufactured by conventional extrusion processing.

More specifically, the pipes according to the present invention are mainly characterized by what is stated in the characterizing part of claim 1

The process according to the present invention is characterized herein.

Considerable advantages are obtained by the present invention. Thus, the properties of the pipe can be improved without significantly increasing the costs of the material. The processing of the material is simple and various parts, straight pipes, bends, junctions etc. can be manufactured from the same material. Since the polymer materials are compatible they can also be welded together which simplifies assembly and service. The present materials are suitable for carrying abrasive material, such as slurries in, for example the mining industry, or pneumatic conveying of solid material.

As will be discussed in more detail below, the pipes can be produced on-site, i.e. at the site of the installation, e.g. at the mining facility. In practice, the thickness of the layers can be separately and independently selected. Typically, the thickness of the outer layer is dimensioned depending on the required system pressure and temperature. With system, the pipeline network along with the connected process equipment is meant.

The thickness of the abrasion layer can be selected, e.g., depending on wear allowance. This latter feature depends on the material specific abrasion constant and on the expected service life of the system. The material specific abrasion coefficient is determined with tests using the actual material compositions and process parameters.

Bends in the pipeline can be designed separately.

Further details and advantages of the invention will become evident from the following detailed description of the invention. Reference is made to the appended drawings, in which FIG. 1 shows the cross-section of a first embodiment of a pipe according to the present invention;

As discussed above, the present invention provides a novel kind of polymer pipe and piping parts suitable for conducting fluids with suspended abrasive particles. In a preferred embodiment, the more stringent requirements of the industry are met by combining polymeric abrasion resistant materials with at least one structural polymer material in a multiple layer structure.

The pipe and all system parts have at least two layers, an outer, structural layer, which can be formed by a polyolefin material or poly(acrylonitrile butadiene styrene), and an inner layer of an abrasion resistant material.

According to a particularly preferred embodiment, the wall structure further comprises a middle layer of conductive material, which is capable of acting as a detector of the depletion of the inner layer. There can be further polymer layers in the structure. Thus, the multilayer pipe according to the present invention comprises at least two layers, preferably two to seven layers. Preferably, at least a part of the layers is produced from materials which can be co-extruded.

Figure 1:
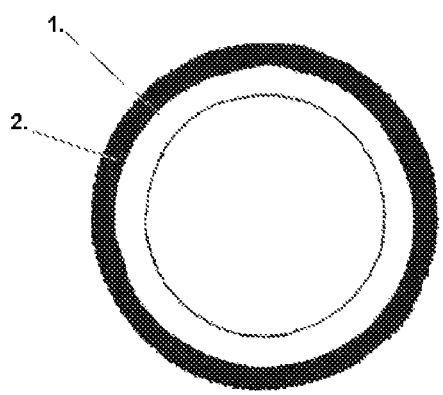

FIG. 1 shows the cross-section of a pipe having two layers. As can be seen, there is an inner layer 1, which forms the abrasion resistant surface of the pipe. The second layer is denoted with reference numeral 2 and it forms the pressure resistant structural layer of the pipe. It can be the outermost layer of the pipe as indicated in the drawing, but can also be placed in the middle of a multilayered wall structure.

Figure 2:
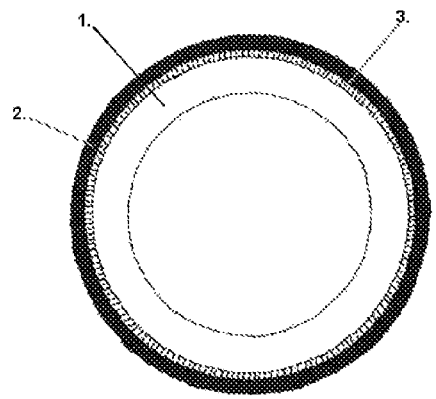
FIG. 2 depicts the cross-section of a second embodiment of a pipe according to the present invention, wherein there is an alarm layer between the inner layer and the structural layer.
Figure 3:
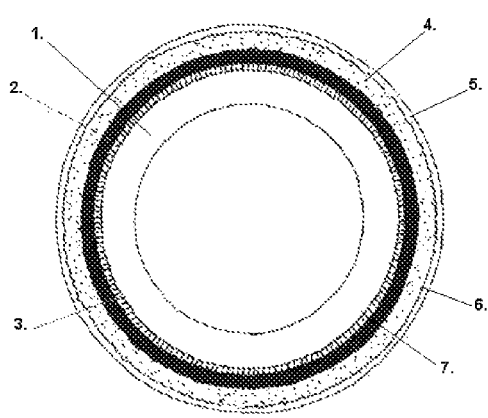
FIG. 3 shows the cross-section of a third embodiment of a pipe, comprising with layers increasing rigidity and giving flame retardant properties.
Figure 4:
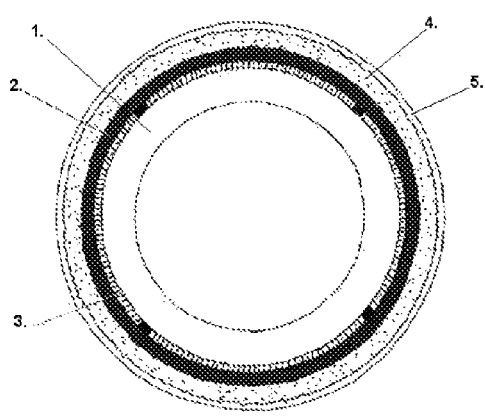
FIG. 4 shows the cross-section of a fourth embodiment of a pipe according to the present invention, comprising four alarm layers.

As shown in FIGS. 2 to 4, the pipe can also have the following layers:

A. An integrated alarm layer 3 that may consist of one or several sectors (cf. FIGS. 2 to 4); the integrated alarm layer is an intermediate layer which lies between the inner layer 1 and the structural layer 2, abutting with the inner layer and functioning as an indicator of the wear or depletion of the inner layer.

B. A foamed layer 4 to improve rigidity and enhance adhesion to layers 3 and 5 (cf. FIGS. 3 and 4); the foamed layer can be placed on either side of the structural layer, however, it is preferred to place it on the outside, because it forms a suitable surface for a skin layer or protecting uppermost layer.

C. An outer layer 5 with flame retardant properties (cf. FIGS. 3 and 4);

D. One or several layer of adhesive material 6 and 7 (cf. FIG. 3).

Figure 5:
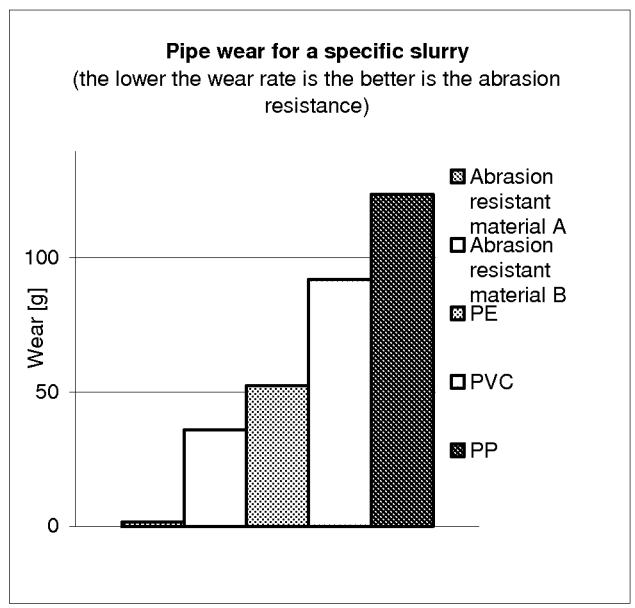
FIG. 5 shows a bar chart indicating the wear rate for a number of polymer materials.

The materials are selected such that the inner layer 1 shows better resistance to abrasive wear than the other layer materials. The layer can consist of for example a material having elastomeric properties, such as a thermoplastic elastomer (TPE), or of a material harder than ordinary PE-HD, such as a higher molecular weight polyolefin (e.g. high molecular weight polyethylene (PE-HMW) or ultra high molecular weight polyethylene (PE-UHMW) or another technical polymer such as for example polyamide (PA). All options have been shown to improve the performance of the polyolefin pipe (FIG. 5). FIG. 5 indicates pipe wear for a specific slurry consisting of aluminosilicate particles in water. The lower the wear rate, the better the abrasion resistance.

Although no exact limit can be given for the high molar mass polyethylenes, generally the suitable materials have molecular weights higher than 500,000 g/mol, for high molecular weight up to about 2.5 million g/mol and for PE-UHMW grades from about 2,500,000 g/mol to 10,000,000 g/mol, in particular about 3 to 6 million g/mol.

The TPEs include elastomeric materials that can be moulded or extruded or otherwise melt-processed, such polyurethanes, polyester copolymer, styrene copolymers (such as SBS rubbers), TPVs and elastomeric alloys.

The structural layer 2, which forms the matrix of the pipe, consists of a bulk polymer e.g. polyolefin [polyethylene (PE), polypropylene (PP), polyvinyl chloride (PVC)] or poly(acrylonitrile butadiene styrene) (ABS), said polymer material being co-extrudable and weldable with the inner and alarm layer materials.

The alarm layer 3 consists of a polymer material, preferably based on the structural layer polymer, made permanently conductive. The properties of electrical conductivity can be obtained by blending the polymer material with conductive particles, such as fillers comprising carbon black or metal particles, conductive fibres or nanocomposites, including conductive carbon nanotubes. The layer may also contain, optionally and preferably in combination with the above conductive particles or fibres, inherently conductive polymers (ICPs), such as polyacetylene, polythiophene, polyaniline or polypyrrole, or ionomers containing alkaline and/or earth alkaline metal ions or mixtures thereof. Preferably, the material has a surface resistivity in the conductive range, in particular the surface resistivity is from 1 to $10^6$ ohm/sq (ASTM D-257)

The foamed layer 4 is based on the same material as the structural layer in order to ensure perfect adhesion to the structural layer. It also enhances the rigidity of the structure. The rough surface of the foamed material enables and improves mechanical bonding of the outermost layer 5. Preferably the foamed layer 4 is based on a polyolefinic material.

The flame retardant layer preferably is capable of protecting the inner layers of the pipe from fire, preferably even up to 400-500° C. The material may be a thermoset based on e.g. a phenol formaldehyde resin, which can be filled with inorganic material, such as glass or other silica based materials, particles of fibres or mixtures thereof, in order further to improve the flame retardant properties of the layers and to improve mechanical properties such as internal pressure resistance.

The pipe according to the above embodiments can be produced by co-extruding at least a part of the layers, in particular the abrasion resistant layer 1, the structural layer 2 and the alarm layer(s) 3. The foamed layer 4 can be either co-extruded or added in a separate coating process. Layer 5 can also be co-extruded or be added by coating downstream on-line or applied in a separate process. Any layers 6 and 7 are added in the co-extrusion process.

In view of the fact that all or many of the layers are co-extruded, the pipe can be manufactured without adhesives.

The pipe can be internally calibrated.

The ratio between the structural and the abrasion resistant material is determined by the desired service life of the pipe. The structural layer determines the nominal pressure of the pipe whereas, as discussed above, the abrasion resistant material determines the wear of the pipe.

Typically, the weight ratio between the abrasion resistant material and the structural material is about 0.1:100 to 100:100, preferably the weight ratio is about 1:100 to 50:100, in particular about 2:100 to 20:100. The thickness of the inner layer varies depending on the application, but typically it is in the range of about 0.1 to 50 mm, in particular about 0.5 to 40 mm. The total wall thickness of the pipe is about 10 to 250 mm, typically about 20 to 100 mm. The cross-sectional diameter can vary widely between about 100 and 5000 mm, typically from about 150 to 500 mm.

The alarm layer or -layers are placed between the abrasive resistant and the structural layer in order to detect when the inner layer is depleted. Since the wear in the pipe might be uneven there can be several alarm zones or sectors each monitored separately in order to detect depletion of the inner layer. Preferably the alarm layer is divided in zones in the longitudinal direction (i.e. along the central axis of the pipe).

According to a particularly preferred embodiment, the operation of the alarm layer(s) is based on the electrical conductivity. The thickness of the alarm layer is typically about 0.01 to 10 mm, typically 0.1 to 5 mm. If the layer is divided into separate zones, these are preferably electrically separated so as to provide for individual measurement of conductivity.

The present invention also provides for a novel concept of producing polymer piping suitable for slurries and other media containing abrasive matter. Thus, the novel pipes can be tailor-made based on testing of the actual abrasive materials and by the process conditions (expected operation time and service intervals of a mine, for example) at the actual sites. Based on these features, the outer and inner layer can be separately selected. Typically, the outer layer is dimensioned based on the pressure class of the projected pipeline. Since abrasion can vary in different parts of the system, parts, which are particularly demanding in this respect (e.g. pipe sections subsequent to pumps or sections where the flow pattern changes) can be specially designed to give bends with thicker walls or greater bending radius or performed with special materials.

This novel concept provides considerable advantages. It will give a system which meets the client's need and which has a lifetime with a predetermined length. Compared to steel pipes, all parts of the piping are lighter which will facilitate installation. Conventionally, installations are complicated and require long time and downtime of operations. With the present system, the risk of unscheduled downtime is minimised.

Compared to conventional technology using steel pipes, the flexibility of the present pipes is greater which makes it possible to install the system on an uneven ground. There is no corrosion and no de-lamination, and longitudinal dimension stability is good. The alarm layer will indicate potential wear of the inner layer. The material of the pipe can be recycled or combusted. The joints will have smoother inner surfaces than obtainable by other methods.

A particularly interesting advantage is the feature that the present pipes can be produced in longer parts/with greater lengths which means that by using mobile production technology whole pipelines can be formed without joints.

Naturally, the possibility to combine the best properties of different materials (inner layer abrasion resistant and the outer layer pressure resistant) is a particular attractive feature.

The invention claimed is:

1. Abrasion resistant polymer pipe, comprising a first, abrasion resistant inner layer (1) and a second, structural layer (2), which is placed on the outer side of the inner layer, said first and said second layers comprising extrudable polymer materials, wherein there is an intermediate layer (3) between the inner layer (1) and the structural layer (2), abutting with the inner layer and said intermediate layer functioning as an indicator of the wear or depletion of the inner layer, and the intermediate layer (3) is electrically conductive having a resistance in the conductive range, and wherein the weight ratio of the abrasion resistant material to the structural material is in the range from about 1:100 to 50:100, the thickness of the inner layer is in the range from about 0.5 to 40 mm, and the total wall thickness of the pipe is in the range from about 20 to 100 mm.

2. The polymer pipe according to claim 1, wherein the inner layer (1) is formed from a material having elastic, rubber-like properties or a greater hardness than the material forming the structural layer (2).

3. The polymer pipe according to claim 1, wherein the inner layer (1) is formed from a thermoplastic elastomer or from a polyolefin having high or ultra high molecular weight.

4. The polymer pipe according to claim 1, wherein the inner layer (1) is formed from a polymeric material harder than the structural layer material, selected from the group of high molecular weight polyethylene (PE-HMW) and ultra high molecular weight polyethylene (PE-UHMW) or a technical polymer.

5. The polymer pipe according to claim 1, wherein the nominal pressure of the pipe is determined by the strength properties of the structural layer (2).

6. The polymer pipe according to claim 1, wherein the structural layer (2) is formed from a polymeric material selected from the group of polyolefins and poly(acrylonitrile butadiene styrene) (ABS).

7. The polymer pipe according to claim 1, wherein the intermediate layer (3) contains electrically conductive or dissipating particles, fibres, tubes or polymers or mixtures thereof.

8. The polymer pipe according to claim 7, wherein the intermediate layer (3) consists of a polymer material made permanently conductive by blending the polymer material with conductive particles, conductive fibres, conductive nanocomposites or conductive polymers, or mixtures thereof.

9. The polymer pipe according to claim 1, wherein the intermediate layer (3) is divided into zones, which are electrically insulated from each other.

10. The polymer pipe according to claim 1, wherein the inner (1), the intermediate (3) and the structural layers (2) are formed from polymer materials, which are co-extrudable and weldable with each other.

11. The polymer pipe according to claim 1, comprising a foamed layer (4) for improving rigidity of the pipe.

12. The polymer pipe according to claim 11 wherein the foamed layer (4) is based on the same material as the structural layer (2).

13. The polymer pipe according to claim 1, wherein the foamed layer (4) is placed on the outside of the structural layer (2).

14. The polymer pipe according to claim 1, comprising a flame retardant layer (5) which forms the skin layer of the pipe.

15. The polymer pipe according to claim 1, comprising one or more adhesive layers (6, 7) between adjacent polymer layers for improving adhesion.

* * * * *